3,410,719
AIR-CURABLE ACRYLIC-BASED COATING COMPOSITIONS SUBSTRATE COATED THEREWITH, AND PROCESS OF COATING
Robert Roper, Berkeley Heights, N.J., assignor to Esso Research and Engineering Company, a corporation of Delaware
No Drawing. Filed Aug. 31, 1964, Ser. No. 393,357
11 Claims. (Cl. 117—161)

ABSTRACT OF THE DISCLOSURE

Acrylic esters containing at least two acrylic groups per molecule are polymerized with a catalyst system composed of an organo hydrazine and either an organic peroxide or a soluble organic salt of a polyvalent metal. The resulting polymer is useful as a coating composition which is air-curable.

---

The present invention relates to air-curable coating compositions of acrylic esters and to the process of making the same. A novel process and catalyst system for the addition polymerization of acrylic esters is hereinafter set forth. More particularly, this invention relates to the preparation of coating compositions from acrylic esters that contain at least two acrylic groups per molecule which are air-curable at a temperature of between about 10° C. and about 100° C. with a catalyst system consisting essentially of an alkyl or aryl hydrazine and a compound selected from the group consisting of organic peroxides and soluble organic salts of polyvalent metals.

The polymerization of vinyl type compounds has achieved great importance in the plastics industry. For the most part polymerizations of this type have commonly been catalyzed by peroxidic compounds at high temperatures and in the substantial absence of air. While the emulsion or bulk polymerization of acrylic type compounds with a variety of catalytic initiators is well known, it has up to this time been difficult to prepare air-curable coating compositions which contain only acrylic groups as the source of unsaturation for air-curing, for the reason that these coating compositions fail to cure when in the physical state of a thin film. This phenomenon has been attributed to air inhibition.

Many attempts have been made to prepare air-curable coating compositions containing acrylic groups but without substantial success. It has been proposed to impregnate fibrous sheets or cloth with a resin prepared by the copolymerization of dihydric alcohol esters of alpha-olefinic dicarboxylic acids and ethylenic monomers with a peroxy polymerization catalyst and a hydrazine in the absence of oxygen. See, for example, U.S Patent 2,429,060. It has further been proposed to polymerize and copolymerize vinyl type compounds to bulk plastic type materials with an α,α-dialkylarylmethyl hydroperoxide and a hydrazine. See, for example, U.S. Patent 2,610,965. A process for the bulk polymerization of methyl methacrylate in the absence of oxygen with a cupric ion, an acyl hydrazine and an oxidizing agent is suggested in U.S. Patent 2,686,775. More recently, it has been suggested to photopolymerize organic vinyl compounds to coherent plastic masses with a photo-reducible dye and a mild reducing agent such as a hydrazine derivative. See, for example, U.S. Patent 2,875,047. However, the preparation of air-curable coating compositions containing acrylic groups has up to this time not been achieved.

The present invention overcomes the foregoing difficulties and affords a means by which air-curable coating compositions can be produced with acrylic type materials. It is, therefore, an object of this invention to provide the art with a novel process and catalyst system for preparing air-curable coating compositions from polymerizable acrylic materials that contain at least two acrylic groups per molecule. Other objects will appear hereinafter.

According to the present invention, acrylic esters containing at least two acrylic groups per molecule are admixed with a catalyst system consisting essentially of an alkyl or aryl hydrazine and a compound selected from the group consisting of organic peroxides and soluble organic salts of polyvalent metals. The admixture is then applied as a thin film to the material to be coated and permitted to cure in the presence of air at a temperature of between about 10° C. and about 100° C. Alternatively, the acrylic esters are admixed with one of the components of the catalyst system described above and the other component, preferably the hydrazine, is added just before application of the mixture to the material to be coated.

The unique aspect of this invention is that it makes possible the air-curing of monomers or polymers containing at least two acrylic groups per molecule. Conventional curing agents, such as peroxide catalysts, with or without accelerators, such as cobalt naphthenate or dimethylaniline, do not effectively cure these compositions when they are applied as surface coatings with a large surface exposed to the atmosphere.

Compounds which can be advantageously air-cured in accordance with the present novel process are monomeric or polymeric compounds that contain at least two acrylic groups per molecule, e.g., acrylic esters of polyhydric alcohols, polymers containing acrylic groups and mixtures thereof. The terms "acrylic" or "acrylate group," as used in the present description, are defined to include esters of acrylic acid as well as the alkyl substituted acrylic acids, i.e., methacrylic acid, ethacrylic acid, etc. In general, the acrylic or acrylate group can be represented by the following structural formula:

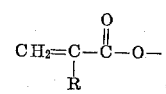

wherein R is selected from the group consisting of hydrogen and $C_1$–$C_4$ alkyl. While the air-curable compounds of the present novel process may or may not technically be termed esters, i.e, the reaction product of an acid and an alcohol, the term "acrylic ester" as used herein will, for convenience sake, be defined as a compound which contains acrylyl or alkacrylyl groupings.

Examples of acrylic esters, as defined hereabove, which are subject to addition polymerization and which can be utilized in accordance with the present novel process, include: ethylene dimethacrylate; trimethylolpropane trimethacrylate; tetraethylene glycol dimethacrylate; ethylene diacrylate; pentaerythritol tetraacrylate; 1,2,6-hexanetriol triacrylate; dipropylene glycol diacrylate; sorbitol hexacrylate; p-xylylene glycol dimethacrylate; m-xylylene glycol diethacrylate; 1,3-di(hydroxymethyl)cyclohexane diacrylate; 2,2-di(4-beta acryloxyethoxyphenyl)propane; polyethylene glycol diacrylate; di(hydroxymethyl) toluene dimethacrylate; di(hydroxymethyl) - xylene diacrylate; polypropylene adipate terminated with acrylic groups; polyesters formed by the addition polymerization of phthalic anhydride with glycidyl methacrylate in the presence of an amine; polyesters prepared from phthalic anhydride and diethylene glycol terminated with methacrylic groups; polyesters from glycidyl acrylate or methacrylate and an anhydride, such as phthalic anhydride; polyvinyl acrylate; polyvinyl methacrylate; polvinyl acetate modified by transesterification with acrylic acid to yield a polymer with a chemical structure

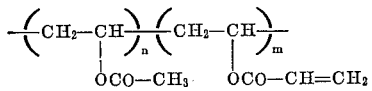

wherein $n$ and $m$ are positive integers which can range respectively from 1 to 10,000 and 2 to 100; 1,1,1-tri($\beta$-acryloxyethoxymethyl) propane; tetra($\beta$-methacryloxy isopropoxymethyl) methane; polyesters formed from glycerine and phthalic anhydride terminated with methacrylic groups; polyesters formed from propylene glycol, sebacic acid, trimellitic anhydride, and acrylic acid; polyurethanes formed from toluene diisocyanate, 1,3-butanediol, and propylene glycolmonomethacrylate; polyurethanes formed from hexamethylene diisocyanate, trimethylol propane, and ethylene glycol monoacrylate; and $\beta$-acryloxyethylcellulose. Acrylic esters of polyhydric alcohols are preferred.

Hydrazine derivatives which comprise the first part of the present two-part catalyst system are alkyl or aryl substituted hydrazines and their organic and inorganic acid salts. In general, the hydrazine derivatives are represented by the following empirical formulae:

wherein $R_1$ is selected from the group consisting of $C_4$–$C_{20}$ alkyl, aryl, substituted aryl, alkaryl and aralkyl groups and Z is an organic or inorganic acid. Aryl substituted hydrazines are preferred. Examples of suitable hydrazine derivatives are: butylhydrazine, octylhydrazine, dodecylhydrazine, hexadecylhydrazine; phenylhydrazine, naphthylhydrazine, benzylhydrazine, phenethylhydrazine, p - methylphenylhydrazine, p - ethylphenylhydrazine, phenylhydrazine hydrochloride, phenylhydrazine sulfate, benzylhydrazine nitrate, pentylhydrazine acetate, p - carboxyphenylhydrazine, 2,4,6 - trichlorophenylhydrazine, 2,5 - dichlorophenylhydrazine, p - bromophenylhydrazine, p - methoxyphenylhydrazine, m - ethoxyphenylhydrazine, p - phenoxyphenylhydrazine, p - carbethoxyphenylhydrazine, p - acetylphenylhydrazine and p - methylolphenylhydrazine.

The second component of the present novel catalyst system is selected from the group consisting of organic peroxides and soluble organic salts of polyvalent metals. The organic peroxides and the organic metal salts in general should be sufficiently soluble in the acrylic ester to provide the proper level of catalytic activity. More specifically, the organic metal salts should have sufficient solubility to give at least about 0.00001%, by weight, soluble metal ion, and preferably between about 0.0001% and about 0.001% metal ion. The organic peroxides should have a solubility of at least about 0.1%, by weight, and preferably about 1% or greater.

Generally, the organic peroxides can be either hydroperoxides, i.e, those having the empirical formula ROOH, or "organic" peroxides, i.e., those having the empirical formula ROOR, wherein R in each instance is an organic radical. In general, the organic peroxides can be defined as those oxygen-containing compounds which upon decomposition yield free radicals. Suitable examples of peroxides include ketone peroxides, such as methyl ethyl ketone peroxide, methyl isobutyl ketone peroxide and cyclohexanone peroxide; hydroperoxides, such as cumene hydroperoxide, 1 - methyl - 1 - hydroperoxycyclopentane, tetrahydrofuran hydroperoxide, tetralin hydroperoxide, 2-methyl tetrahydrofuran hydroperoxide, tertiarybutyl isopropylbenzene hydroperoxide; diacyl peroxides such as benzoyl peroxide, bis(4 - chlorobenzoyl) peroxide, bis(4-methoxybenzoyl) peroxide, phthalyl peroxide, lauroyl peroxide, acetyl lauroyl peroxide, adipoyl peroxide; dialkyl peroxides, such as di-tert - butylperoxide; di-tert-cumylperoxide, dicumyl peroxide; and peresters, such as tertiarybutyl peracetate, tertiarybutyl perbenzoate, and di-tert-butyl permalonate.

The soluble organic metal salts utilized as a component of the instant novel catalyst system are the soluble organic salts of polyvalent metals, i.e., metals having two or more possible valence states. The source or character of the organic portion of the salts is not critical for the reason that its purpose is to provide solubility for the polyvalent metal in the acrylic ester. As a point of reference, allusion is made to the Periodic Chart of the Elements found in the *Handbook of Chemistry and Physics*, pp. 392–393, 35th edition, Chemical Rubber Publishing Company. The polyvalent metals used in the present process are, in general, selected from Groups I–B, II–B, III–B, IV–B, V–B, VI–B, VII–B, VIII and a portion of Groups III–V, IV–A, V–A and VI–A. Desirably, the polyvalent metals are selected from Groups I–B, II–B, IV–B, V–B, VI–B, VII–B and VIII. Specifically, polyvalent metals within the above definition include: copper, zinc, gallium, tin, antimony, cerium, titanium, zirconium, vanadium, chromium, molybdenum, manganese, iron, cobalt and nickel. Copper is preferred. The metals can be either in a low valent state, such as cuprous acetate, or in a high valent state, such as cupric stearate.

Suitable examples of the organic metal salts, as described above, include carboxylic acid salts, such as zinc acetate, zinc benzoate, zinc laurate, zinc stearate, tin tartrate, lead acetate, lead oleate, lead stearate, zirconium naphthenate, chromium acetate, manganese tartrate, manganese acetate, manganese benzoate, manganese citrate, iron acetate, iron octanoate, iron naphthenate, iron malate, iron lactate, nickel acetate, cobalt acetate, cobalt benzoate, cobalt linoleate, cobalt propionate, copper naphthenate, copper tallate, copper 2-ethyl hexanoate, copper linoleate, copper butyl phthalate, copper acetate, copper ricinoleate and copper stearate; chelates, such as copper-8-quinolinolate, copper chelate of acetyl acetone, copper chelate of benzoyl acetone, copper chelate of alanine, copper chelate of dipropionyl methane, and acetyl acetone vanadium complex; as well as any suitable compound or carrier of the above-described polyvalent metals, that will provide the minimum required concentration of metal ion for the proper level of catalytic activity as hereinabove specified.

It is to be emphasized that the organic metal salt can be selected from any suitable source. The only requirement for it is that it be soluble in the polymerizable liquid acrylate material so as to provide the necessary concentration of metal ions.

In carrying out the present novel process, the polymerizable acrylate, e.g., ethylene dimethacrylate, is admixed with the instant novel catalyst system, e.g., phenylhydrazine and copper naphthenate at a non-reactive temperature, i.e., a temperature at which no polymerization or other adverse reaction takes place, such as room temperature (about 20° C.), and thereafter applied as a thin film, e.g., between about 0.1 mil and about 10 mils, preferably between about 1 and about 6 mils, thickness, to the material to be coated. To obtain proper film thickness with polymerizable acrylates of low viscosity, e.g., ethylene dimethacrylate, certain non-reactive polymeric materials can be added to increase the viscosity of the polymerizable acrylate. For example, such polymers as poly(ethyl acrylate), poly(methyl acrylate), ethyl acrylate-methyl methacrylate copolymer, poly(vinyl acetate), vinyl acetate-ethyl acrylate copolymer, or other high molecular weight, non-reactive polymers compatible with the polymerizable acrylate ester can be added to increase the viscosity of the polymerizable acrylate. These polymers can be added in amounts between about 1 and about 30 wt. percent, based on the weight of acrylate ester. After the film is applied to the appropriate thickness, it is allowed to air-dry at a temperature of between about 10° C. and about 100° C., preferably between about 25° C. and about 35° C.

The amount of hydrazine derivative present in the total polymerizable mixture varies between about 0.01 and about 4.0 wt. percent and preferably varies between about 0.1 and about 1.0 wt. percent. The amount of metal ion from the heavy metal organic salt present in the total polymerizable mixture varies between about 0.00001 and about 0.01 wt. percent. The mole ratio of hydrazine derivative to heavy metal can vary between about 10:1 and about 10,000:1 and preferably varies between about 100:1 and about 1,000:1. When the hydrazine-peroxidic compound catalyst system is utilized in the present novel process, the amount of organic peroxide present in the total polymerizable mixture varies between about 0.1 and about 2.0 wt. percent. The weight ratio of organic peroxide to hydrazine derivative can vary between about 2:1 and about 20:1 and preferably varies between about 5:1 and about 10:1.

The above-described compositions are useful as airdryable surface coatings that can be applied by conventional methods such as brushing, spraying, dip-coating, etc. They can be used as solvent-based or solventless coatings on substrates such as wood, steel, tinplate, copper, aluminum, etc. They can either be used as clear coatings or can be converted into paints by adding pigments and extenders that are known in the art and dispersing them by pebble milling, sand grinding, roller milling or any other convenient method. Typically, the air-curable compositions of the present process can be mixed with various other ingredients well known in the art, such as solvents, plasticizers, non-reactive polymers; reactive polymers, such as unsaturated polyesters, polybutadiene, alkyds based on drying oils and many others.

The inventive process is more particularly described in the following examples, which are intended as illustrative only, since numerous modifications and variations therein will be apparent to those skilled in the art.

EXAMPLE 1

A stock solution was prepared by treating ethylene dimethacrylate, containing 60 p.p.m. hydroquinone, in the absence of oxygen with 0.75 volume percent distilled phenylhydrazine (doubly distilled under nitrogen). No organic metal salt was added to this solution. Thereafter, three 2-ml. portions were obtained from this stock solution. The first 2-ml. portion was kept under a nitrogen atmosphere for 14 days. During this period of time, no polymerization occurred; i.e., the mixture remained liquid. The second 2-ml. portion was stored in an open 4-inch test tube, i.e., exposed to air. The lower half of the material in the test tube gelled within three days whereas the upper half, i.e., the half closest to the air, remained liquid. The third 2-ml. portion was poured out as a thin film on a watch glass. No cure took place even after 90 hours of exposure to air.

EXAMPLE 2

Ethylene dimethacrylate, containing 60 p.p.m. of hydroquinone as inhibitor, was treated with 0.75 volume percent distilled phenylhydrazine and 1.5 volume percent of a Varsol solution of copper naphthenate containing 0.09 wt. percent copper. The final admixture had a concentration of 0.001 wt. percent copper. Varsol is a medium range aliphatic hydrocarbon solvent boiling in the range of 329–378° F. The final liquid admixture was then spread out on a watch glass. In 20 minutes the surface of the liquid film showed visual signs of gelation and within 66 hours the film had cured to a solid.

As a control, and for comparative purposes, ethylene dimethacrylate was treated with 2%, by volume, of a 60 wt. percent solution of methyl ethyl ketone peroxide in dimethyl phthalate and with 2%, by volume, of a cobalt naphthenate solution containing 2%, by weight, cobalt. The peroxide-cobalt system is a conventional curative for acrylic systems. This liquid admixture was also spread out on a watch glass. However, after 64 hours the material remained a viscous, semi-liquid gel.

EXAMPLE 3

Two equal samples of ethylene dimethacrylate (100 parts by volume) were admixed with 2 parts by volume of a 60 wt. percent solution of methyl ethyl ketone peroxide in dimethyl phthalate. To Sample No. 1, 4 parts by volume, of a cobalt naphthenate solution containing 2% cobalt was added. To Sample No. 2, one part, by volume, of phenylhydrazine was added. A portion of each of the samples was spread out as a thin film on a watch glass. After 64 hours, Sample No. 1 containing the cobalt naphthenate failed to cure, whereas Sample No. 2 cured to a hard film.

EXAMPLE 4

Samples of diethylene glycol dimethacrylate, tetraethylene glycol dimethacrylate, trimethyl-propane dimethacrylate and 1,3-butylene glycol dimethacrylate are each treated with 0.75 volume percent of distilled phenylhydrazine and 1.5 volume percent of a Varsol solution of copper naphthenate containing 0.09 wt. percent of copper. Each of the liquid admixtures is spread out on a glass plate. A solid film forms within 24 hours in each case.

EXAMPLE 5

Two ml. of ethylene dimethacrylate were admixed with about 20 mg. of benzoyl peroxide and about 20 mg. of dimethylaniline. This mixture is a conventional curative for materials containing vinyl groups. A portion of this mixture was poured out as a thin film on a watch glass. The remaining portion, which was kept in an open test tube, gelled within about a half-hour. The portion prepared as a thin film remained liquid and showed no evidence of cure even after two days.

One ml. of ethylene dimethacrylate was admixed with about 0.15 ml. of a copper naphthenate in Varsol solution containing 2 wt. percent copper. This mixture remained liquid and showed no evidence of cure even after standing two days in a test tube.

EXAMPLE 6

A 1-ml. sample of ethylene dimethacrylate was treated with 0.03 ml. phenylhydrazine and 0.03 ml. of a cobalt naphthenate solution containing 2 wt. percent cobalt. After the mixture was applied as a thin film on glass, it cured to a solid within four hours.

EXAMPLE 7

The procedure of Example 6 was repeated except for substituting 0.03 ml. of a lead naphthenate solution containing 24 wt. percent lead. A solid, cured film was obtained within 18 hours after application.

EXAMPLE 8

The procedure of Example 6 was repeated except for substituting 0.03 ml. of a manganese naphthenate solution containing 6 wt. percent manganese. A solid, cured film was obtained within 18 hours after application.

EXAMPLE 9

In accordance with the procedure of Example 2, four equal samples of ethylene dimethacrylate, containing 60 p.p.m. of hydroquinone, as inhibitor, are each treated with 0.75 volume percent of butylhydrazine, benzylhydrazine, p-methylphenylhydrazine and p-carboxyphenylhydrazine and 1.5 volume percent of a Varsol solution of copper naphthenate containing 0.09 wt. percent copper. Each final liquid admixture is spread out on a watch glass as a thin film. Each of the films cures to a solid within 72 hours.

While there are above described a number of specific embodiments of the present invention, it is obviously possible to produce other embodiments and various equiv-

What is claimed is:

1. A process for coating a substrate which comprises admixing (1) an acrylic ester that contains at least two acrylic groups per molecule, (2) between about 0.01 and about 4.0 wt. percent of a hydrazine derivative selected from the group consisting of alkyl hydrazines and aryl hydrazines, and (3) an organic peroxide, the weight ratio of said organic peroxide to said hydrazine derivative being between about 2:1 and about 20:1; applying the resulting admixture in a thin film to a substrate; and air-drying the applied film at a temperature of between about 10° C. and about 100° C.

2. A process for coating a substrate which comprises admixing (1) an acrylic ester that contains at least two acrylic groups per molecule, (2) between about 0.01 and about 4.0 wt. percent of a hydrazine derivative selected from the group consisting of alkyl hydrazines and aryl hydrazines, and (3) a soluble organic salt of a polyvalent metal selected from groups I–B, II–B, IV, V–B, VI–B, VII–B, and VIII, the mole ratio of said hydrazine derivative to said polyvalent metal being between about 10:1 and about 10,000:1; applying the resulting admixture in a thin film to a substrate; and air-drying the applied film at a temperature of between about 10° C. and about 100° C.

3. An air-curable coating composition prepared by admixing (1) an acrylic ester that contains at least two acrylic groups per molecule, (2) between about 0.01 and about 4.0 wt. percent of a hydrazine derivative selected from the group consisting of alkyl hydrazines and aryl hydrazines, and (3) a compound selected from the group consisting of an organic peroxide and soluble organic salts of polyvalent metals, the weight ratio of said organic peroxide to said hydrazine derivative being between about 2:1 and about 20:1 and the mole ratio of said hydrazine derivative to said polyvalent metal being between about 10:1 and about 10,000:1.

4. The air-curable coating composition of claim 3 wherein the acrylic ester is ethylene dimethacrylate.

5. The air-curable coating composition of claim 3 wherein the hydrazine derivative is phenylhydrazine.

6. The air-curable coating composition of claim 3 wherein the polyvalent metal is copper.

7. The air-curable coating composition of claim 3 wherein the organic peroxide is methyl ethyl ketone peroxide.

8. An article comprising the coating composition of claim 3 applied to a substrate.

9. An air-curable coating composition prepared by admixing (1) an acrylic ester that contains at least two acrylic groups per molecule, (2) between about 0.01 and about 4.0 wt. percent of a hydrazine derivative selected from the group consisting of alkyl hydrazines and aryl hydrazines, and (3) an organic peroxide, the weight ratio of said organic peroxide to said hydrazine derivative being between about 5:1 and about 10:1.

10. An air-curable coating composition prepared by admixing (1) an acrylic ester that contains at least two acrylic groups per molecule, (2) between about 0.01 and about 4.0 wt. percent of a hydrazine derivative selected from the group consisting of alkyl hydrazines and aryl hydrazines, and (3) a soluble organic salt of a polyvalent metal selected from groups I–B, II–B, IV, V–B, VI–B, VII–B and VIII, the mole ratio of said hydrazine derivative to said polyvalent metal being between about 100:1 and about 1,000:1.

11. An air-curable coating composition prepared by admixing (1) ethylene dimethacrylate, (2) between about 0.01 and about 4.0 wt. percent of phenylhydrazine, and (3) copper naphthenate, the mole ratio of phenylhydrazine to copper being between about 100:1 and about 1,000:1.

References Cited

UNITED STATES PATENTS

| 2,405,950 | 8/1946 | Hanford | 260—94 |
|---|---|---|---|
| 2,429,060 | 10/1947 | Hoover et al. | 260—865 |
| 2,471,959 | 5/1949 | Hunt | 260—89.5 |
| 2,601,293 | 6/1952 | Howard | 260—63 |
| 2,606,893 | 8/1952 | Reynolds et al. | 260—84.7 |
| 2,610,965 | 9/1952 | Vandenberg | 260—80 |
| 2,629,708 | 2/1953 | Uraneck et al. | 260—84.7 |
| 2,686,775 | 8/1954 | Howard | 260—88.7 |
| 2,729,624 | 1/1956 | Howard | 260—80 |
| 2,875,047 | 2/1959 | Oster | 96—35 |
| 2,974,118 | 3/1961 | Nischk | 260—45.4 |
| 3,060,160 | 10/1962 | Boussu et al. | 260—88.3 |
| 3,091,602 | 5/1963 | Himes et al. | 260—84.3 |

FOREIGN PATENTS 540,169  10/1941  Great Britain.

WILLIAM D. MARTIN, *Primary Examiner.*

M. R. LUSIGNAN, *Assistant Examiner.*